(12) United States Patent
Taylor et al.

(10) Patent No.: US 10,302,888 B2
(45) Date of Patent: May 28, 2019

(54) FLEXIBLE CABLE INTERFACE DEVICE

(71) Applicants: CommScope Connectivity UK Limited, Swindon, Wiltshire (GB); CommScope Asia Holdings B.V., Bussum (NL)

(72) Inventors: Christopher Charles Taylor, Cheltenham (GB); David Patrick Murray, Bishopston Bristol (GB); Jan Willem Rietveld, Benschop (NL)

(73) Assignees: CommScope Connectivity UK Limited, Swindon, Wiltshire (GB); CommScope Asia Holdings B.V., Bussum (NL)

(*) Notice: Subject to any disclaimer, the term of this patent is extended or adjusted under 35 U.S.C. 154(b) by 0 days.

(21) Appl. No.: 15/549,770

(22) PCT Filed: Feb. 10, 2016

(86) PCT No.: PCT/EP2016/052803
§ 371 (c)(1),
(2) Date: Aug. 9, 2017

(87) PCT Pub. No.: WO2016/128451
PCT Pub. Date: Aug. 18, 2016

(65) Prior Publication Data
US 2018/0045907 A1 Feb. 15, 2018

Related U.S. Application Data

(60) Provisional application No. 62/114,388, filed on Feb. 10, 2015.

(51) Int. Cl.
*G02B 6/44* (2006.01)

(52) U.S. Cl.
CPC ........ *G02B 6/4478* (2013.01); *G02B 6/4471* (2013.01)

(58) Field of Classification Search
None
See application file for complete search history.

(56) References Cited

U.S. PATENT DOCUMENTS 4,840,023 A * 6/1989 Borsani .................. F16G 13/10
248/49
5,202,942 A * 4/1993 Collins ................ G02B 6/3887
385/81

(Continued)

FOREIGN PATENT DOCUMENTS

| EP | 1011180 A1 * | 6/2000 |
| GB | 2 238 186 A | 5/1991 |
| WO | 97/47999 A1 | 12/1997 |

OTHER PUBLICATIONS

International Search Report and Written Opinion of the International Searching Authority for corresponding International Patent Application No. PCT/EP2016/052803 dated Apr. 18, 2016, 11 pages.

*Primary Examiner* — Michael Stahl
(74) *Attorney, Agent, or Firm* — Merchant & Gould P.C.

(57) ABSTRACT

A device for securing fiber optic cables to telecommunications equipment. The device includes a cable receiver for receiving fiber optic cables, a mounting base for mounting to telecommunications equipment, and a neck extending between the cable receiver and the mounting base. The neck includes a flexible area to flex the cable receiver along at least two different planes.

18 Claims, 21 Drawing Sheets

(56) References Cited

U.S. PATENT DOCUMENTS

| | | | |
|---|---|---|---|
| 5,933,557 A * | 8/1999 | Ott | G02B 6/3887 |
| | | | 385/86 |
| 6,571,042 B1 | 5/2003 | Kordahi | |
| 7,001,081 B2 * | 2/2006 | Cox | G02B 6/3887 |
| | | | 385/86 |
| 7,407,331 B2 * | 8/2008 | Momotsu | G02B 6/4471 |
| | | | 385/135 |
| 9,386,723 B2 | 7/2016 | Kostecka et al. | |
| 2008/0131070 A1 * | 6/2008 | Zellak | G02B 6/4461 |
| | | | 385/137 |
| 2013/0209042 A1 | 8/2013 | Belenkiy et al. | |
| 2016/0139355 A1 | 5/2016 | Petersen | |

* cited by examiner

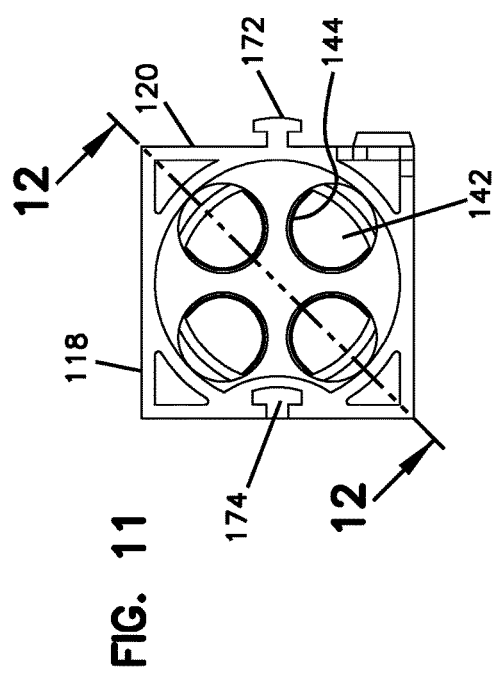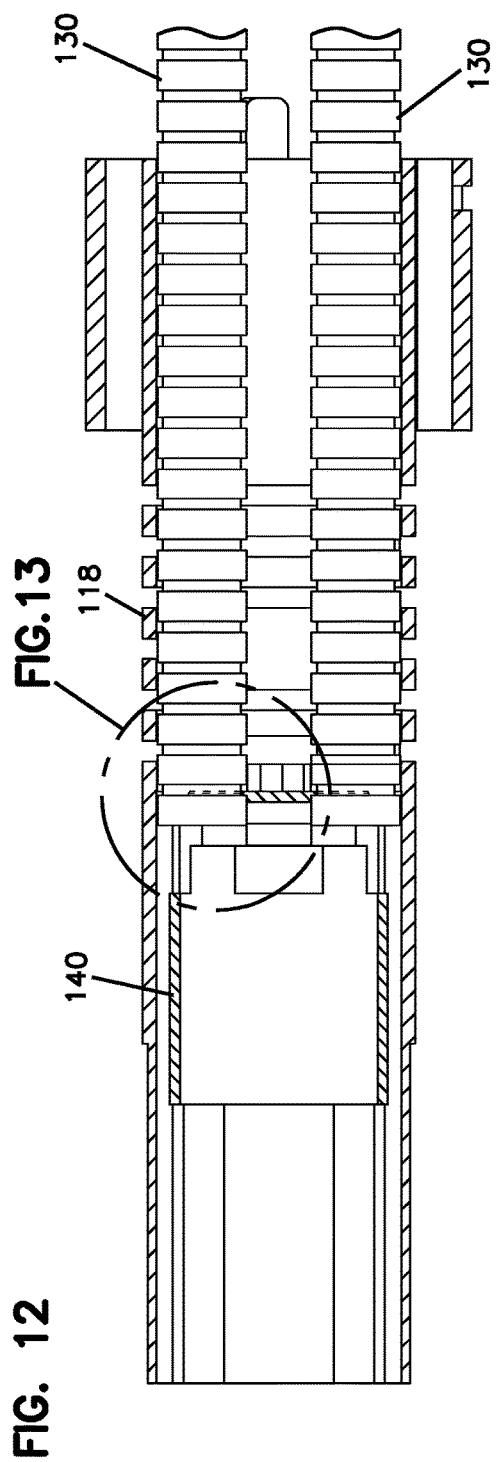

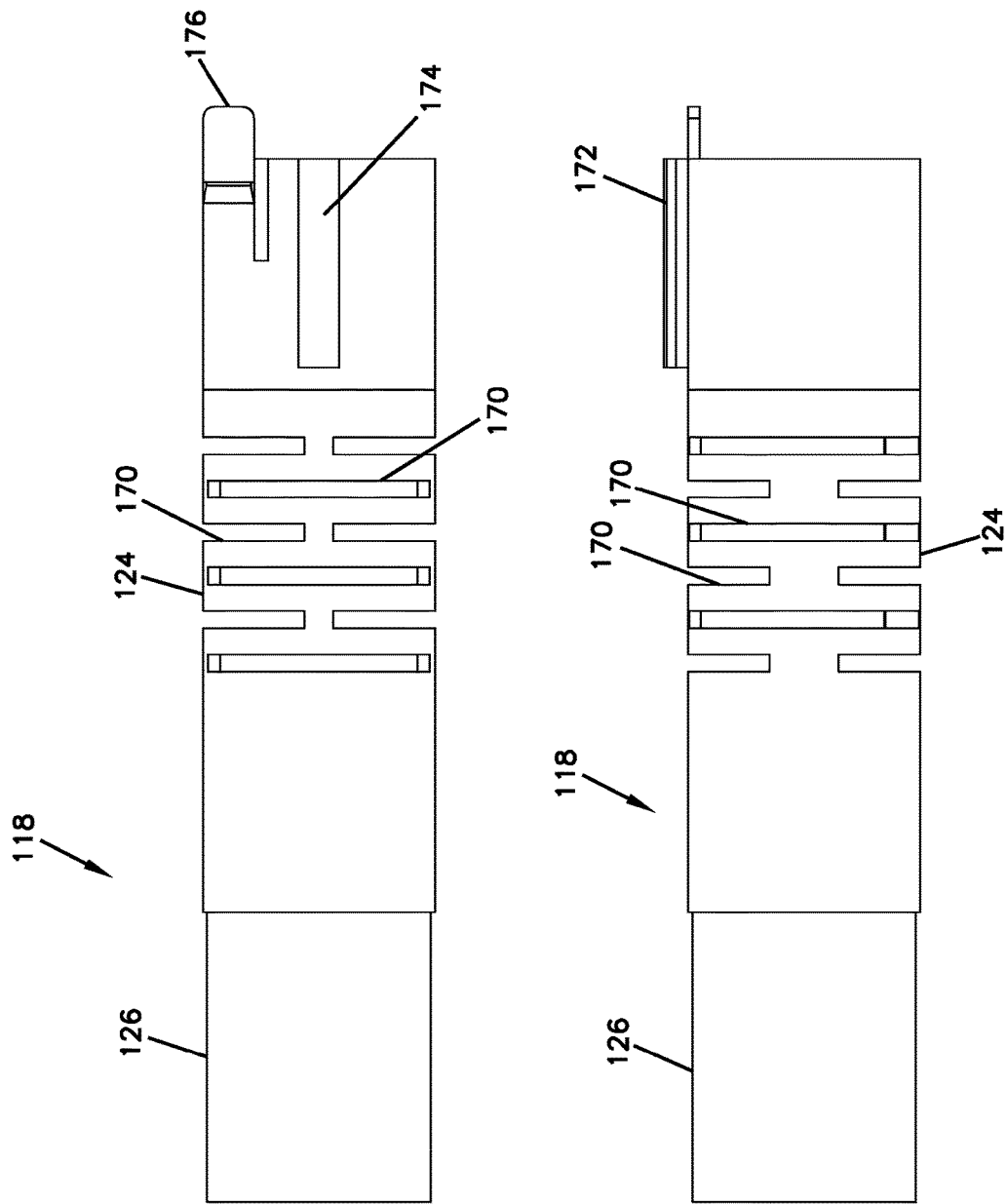

FLEXIBLE CABLE INTERFACE DEVICE

CROSS-REFERENCE TO RELATED APPLICATION

This application is a National Stage Application of PCT/EP2016/052803, filed on Feb. 10, 2016, which claims the benefit of U.S. Patent Application Ser. No. 62/114,388, filed on Feb. 10, 2015, the disclosures of which are incorporated herein by reference in their entireties. To the extent appropriate, a claim of priority is made to each of the above disclosed applications.

TECHNICAL FIELD

The present disclosure relates generally to telecommunications equipment. More particularly, the present disclosure relates to fiber optic cabling and the method of securing thereof to a cabinet chassis or other equipment.

BACKGROUND

Telecommunications equipment containing optical fibers is known. Fiber optic cables that carry a plurality of optical fibers over distances to connect to equipment are also known. Some cables, such as trunk cables, are often configured to have a low flexibility. Because of the low flexibility, it is often difficult to install the cables around tight bends and within small places. This becomes a problem when attempting to connect the cables to telecommunications equipment. Because of this, there is a need for a system, method and device to improve the mounting of the cables to telecommunications equipment.

SUMMARY

One aspect of the present disclosure relates to a device, system and method for securing one or more fiber optic cables to telecommunications equipment where the device includes a cable breakout area. The device also allows for flexible positioning of one end of the device connected to the cable relative to an opposite end of the device connected to the equipment. Preferably, the flexible positioning includes flexible positioning in three dimensions.

One aspect of the present disclosure relates to an adaptor or bracket for securing fiber optic cables to telecommunications equipment. The adaptor includes a cable receiver for receiving one or more fiber optic cables, a mounting base for mounting to telecommunications equipment, and a neck extending between the cable receiver and the mounting base. The neck includes a plurality of flex points to flex the cable receiver along at least two different planes.

Another aspect of the present disclosure relates to a fiber-optic cable adaptor mounted to telecommunications equipment. The adaptor includes a neck with a plurality of flex points between a fixed end and a free end. The plurality of flex points provide three-dimensional flexion with respect to the telecommunications equipment. The adaptor also includes a fiber-optic cable support secured to the neck free end.

A still further aspect of the present disclosure relates to a method for flexibly securing fiber optic cables with respect to telecommunications equipment. The method includes the steps of securing an adaptor mount to the telecommunications equipment and receiving the fiber optic cables within at least one cable receiver flexibly secured with respect to the adaptor mount. The cable receiver is flexible in three dimensions with respect to the adaptor mount. The method also includes the step of securing the fiber optic cables within the at least one cable receiver with at least one fastener.

One aspect of the present disclosure relates to a flexible breakout including a flexible breakout housing which includes a first end for mounting to telecommunications equipment, and a second opposite end for mounting to a telecommunications cable. The breakout housing is flexible in three dimensions with respect to the first end.

The breakout housing can include one or more internal flexible tubes. A tube holder within the housing may also be provided.

A heat shrink can be utilized to extend over the end of the jacket of the cable, and a portion of the breakout housing.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 11 illustrates an end view of the cable breakout housing;

FIG. 12 illustrates a side view in cross-section of the cable breakout housing and the internal tubes;

FIG. 15 illustrates a side view of the cable breakout housing;

FIG. 16 illustrates a further side view of the cable breakout housing;

DETAILED DESCRIPTION

Figure 1A:
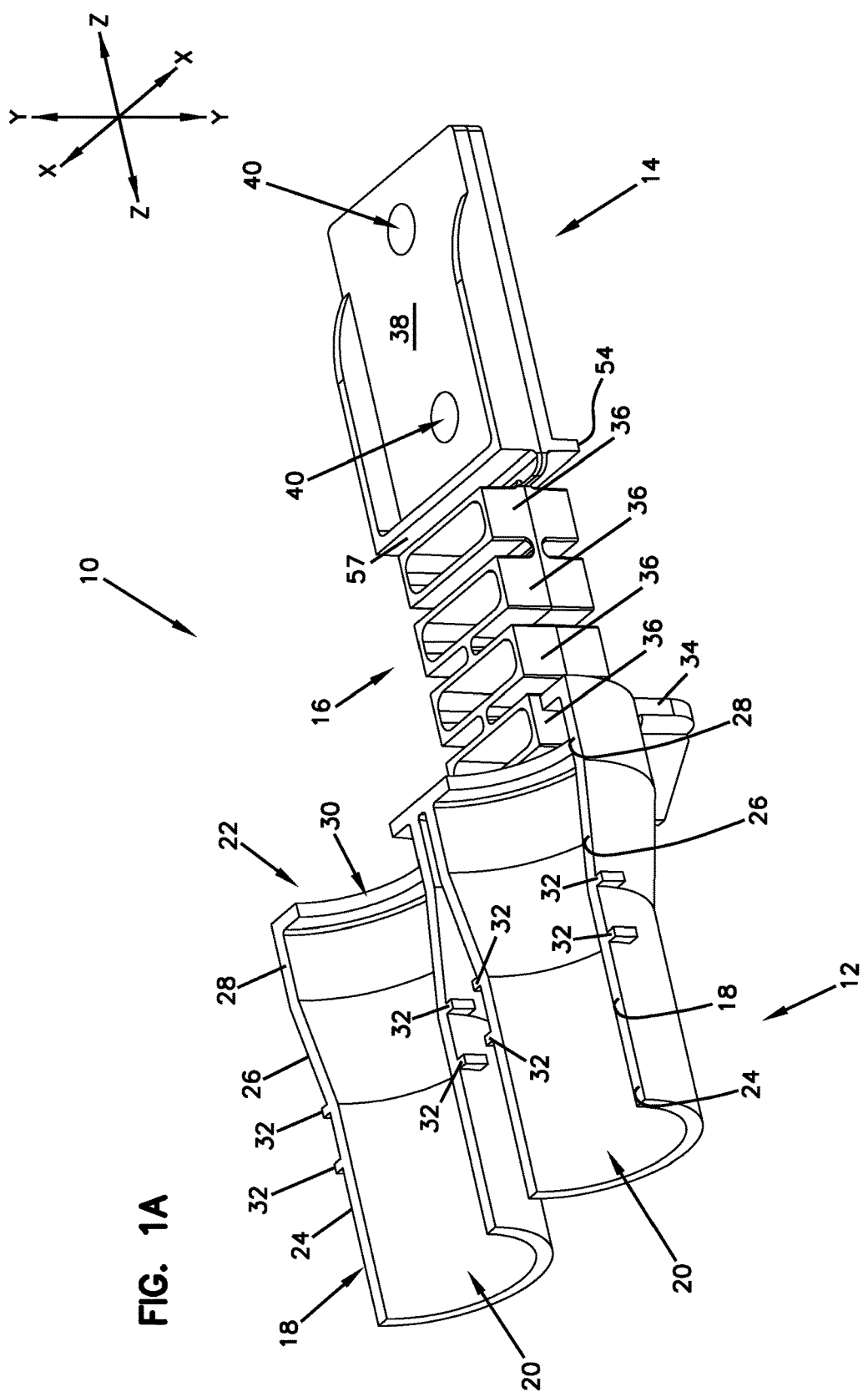
FIG. 1A illustrates a side perspective view of a cable bracket adaptor, for use with a cable breakout, according to one embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Typical fiber optic cables include a trunk cable portion that encloses a plurality of optical fibers disposed therein, for example as described in U.S. Patent Application 62/091,108, filed Dec. 12, 2014, hereby incorporated by reference for all intended purposes. Since each cable trunk portion typically includes an outer jacket and the several optical fibers running throughout, and also strength members in some cases, the trunk portion is not very flexible, especially within confined spaces. The fiber optic cables may include a terminating device at an end, with a breakout or fan out device. The fan out device can be configured to separate each optical fiber, or groups of fibers, extending outwardly from the trunk cable portion to then enter fiber optic telecommunications equipment. The fibers can be held by protective tubes in some cases following the breakout.

The present disclosure describes, generally, a flexible breakout device which acts as a connection to secure fiber optic cables, including trunk cables, to telecommunications equipment. Typical telecommunications equipment can include a frame or chassis, for example as described in U.S. Patent Application 62/091,108. The typical frame or chassis can be mounted to a rack. In some embodiments, the rack may be configured to hold a plurality of frames or chassis. The device connects to the telecommunications equipment to provide an increased flexibility. The increased flexibility of the device allows for improved ease of use when securing these cables to the telecommunications equipment. Additionally, the device does not compromise the internal components (e.g. the optical fibers) of the cables.

An example embodiment device 10 is depicted in FIGS. 1-6. The example device 10 may also be referred to as an adaptor or a bracket. Adaptor 10 can include a cable support section 12 and a telecommunications equipment mount section 14. Cable support section 12 of device 10 mounts to a cable breakout or fan out 70 at the end of a jacketed end of a cable. From fan out 70, the fibers are broken out for connection or splicing in the equipment. The cable support section 12 can secure with respect to the telecommunications equipment mount section 14 through a flexible neck 16. As depicted, the cable support section 12, flexible neck 16 and telecommunications equipment mount section 14 can be positioned with respect to each other along a longitudinal axis Z. The flexible neck 16 can provide for three-dimensional flexing between the cable support section 12 and the telecommunications equipment mount section 14.

The adaptor 10 can have a monolithic and unitary construction. As an example, the adaptor 10 can be formed of durable material such as plastic, and through a process such as injection molding.

As depicted, the cable support section 12 can include a pair of receiver volumes 20 preferably adjacently supported in parallel relation by a base 34. Each receiver volume 20 can have a semi-cylindrical shape, for example 180 degrees, with an open access for receiving a fiber optic cable. Preferably, each receiver volume 20 can be defined by a cable receiver end 18 and a fan out receiver end 22. The cable receiver end 18 can have a tray 24 with a shape and size designed to snugly receive a commercially available trunk cable. The fan out receiver end 22 can have a shape and diameter to snugly receive a fan out shower head shaped portion of a fiber optic cable. As depicted, the fan out receiver end 22 can have a ramp-out tray 26 which provides a shape and diameter gradually expanding from the cable receiver tray 24. The fan out receiver end 22 can also have a mouth-end tray 28 extending from the ramp-out tray 26 position having the widest diameter. As depicted, the mouth-end tray 28 can have a consistent shape and diameter. Each receiver volume 20 can have a mouth opening 30 to provide pass-through access for a plurality of optical fibers exiting from a commercially-available fiber optic cable to be secured within the receiver volumes.

As depicted, the cable receiver trays 24 can have fastener guides, for example two pair of protruding notches or guides 32 positioned on opposing outer sides of the receiver volumes 20. The fastener guides 32 can receive fasteners, for example zip ties or straps, to secure cables within the receiver volumes 20.

As depicted, the telecommunications equipment mount section 14 can include a mounting plate 38 with a pair of apertures 40 extending therethrough. A bumper can extend at orthogonal directions from the end of the mounting plate 38 closest to the flexible neck 16. As depicted, the bumper can have a protruding lip 54 extending from the mounting face of the mounting plate 38, and a bather wall 57 extending from the opposing outer face of the base plate. The barrier wall 57 and the protruding lip 54 can extend a common distance away from each other along a common plane Y.

The depicted flexible neck 16 can include several vertebrae 36 connected to each other through flex points. As particularly depicted in FIGS. 2 and 4, the flex points can include first hinges 52 and second hinges 50, aligned orthogonally with respect to each other. The depicted first hinges 52 can flex or fold along an X plane range of motion, and the second hinges 50 can flex or fold along a Y plane range of motion. The first hinges 52 and second hinges 50 can be constructed of sections of reduced material to permit flexing movement upon the application of force. In order to increase flexibility of the neck 16, the first hinges 52 can be positioned adjacent each other and the second hinges 50 can be positioned adjacent each other.

In the depicted embodiment, a first hinge 52 can connect the flexible neck 16 to the telecommunications equipment mount section 14. An additional first hinge 52 can connect additional vertebrae 36 positioned closer to the telecommunications equipment mount section 14, so as to form a series of first hinges. A second hinge 50 can connect the flexible neck 16 to the cable support section 12. Additional second hinges 50 can connect additional vertebrae 36 positioned closer to the cable support section 12, so as to form a series of second hinges. Alternatively (not shown), the first hinges 52 and the second hinges 50 can be positioned in reverse of the described arrangement and/or in alternating positions.

As depicted, the vertebrae 36 can include rectangular-shaped blocks of equivalent shape and dimension positioned in parallel to each other along the adaptor longitudinal axis Z. The vertebrae 36 can be spaced apart from each other along the long sides of each rectangle. The vertebrae 36 can be spaced apart at a distance allowing for flexing motion of the hinge flex points 50, 52. As depicted, the rectangular-shaped blocks 36 can have hollow centers so as to reduce material and weight.

Figure 3:
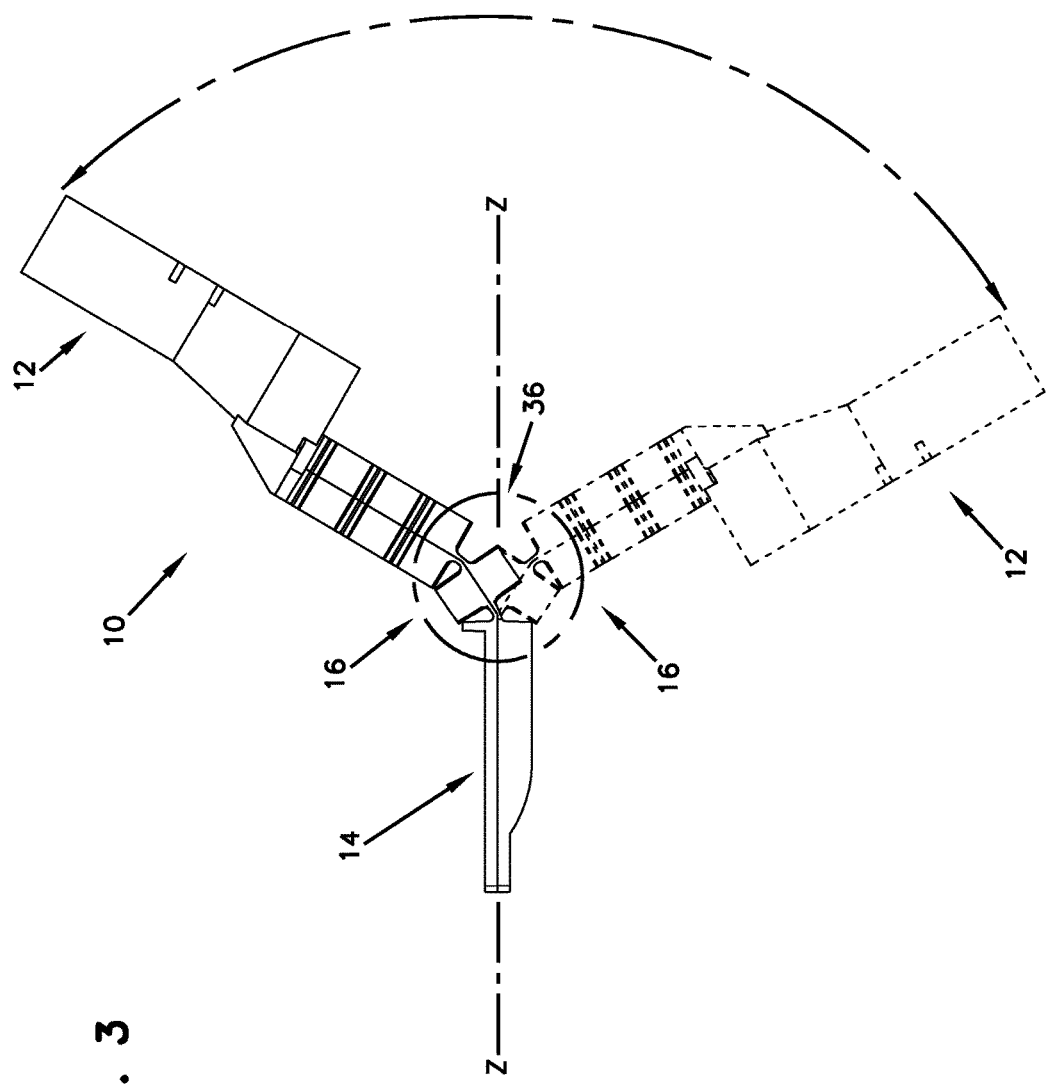
FIG. 3 illustrates a side view of the cable bracket adaptor shown in FIG. 1, showing a first range of flexed motion.
Figure 4:
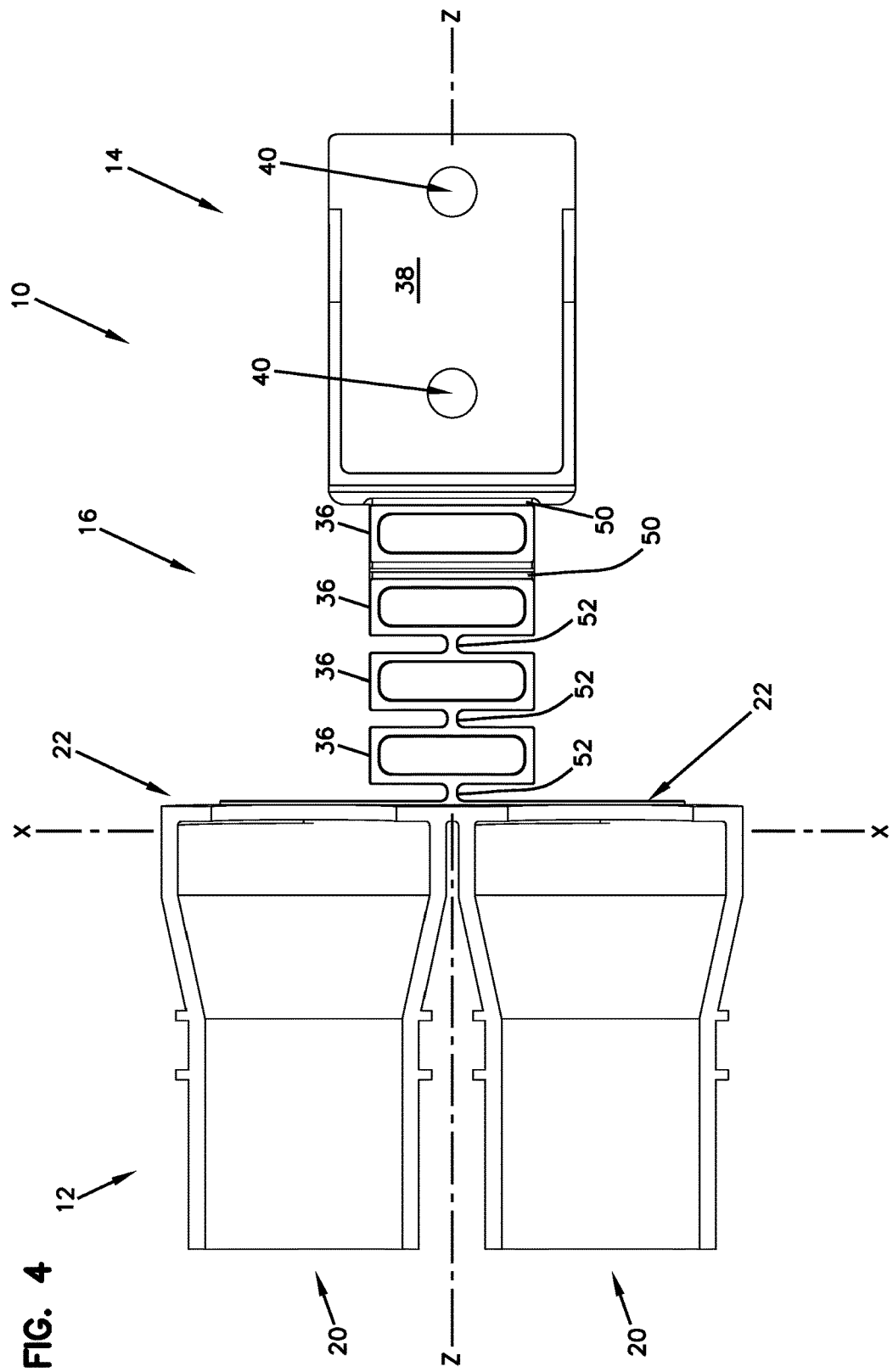
FIG. 4 illustrates a top view of the cable bracket adaptor shown in FIG. 1, shown in a relaxed state.

As particularly depicted in FIG. 3, the second hinges 50 can provide for a flexible range of motion by the cable support section 12 in either direction along the Y plane. The cable support section 12 can flex with respect to the telecommunications equipment mount section 14. As depicted, the range of Y-plane rotation can extend until adjacent rectangular shaped blocks 36 contact each other at contact points.

Figure 5:
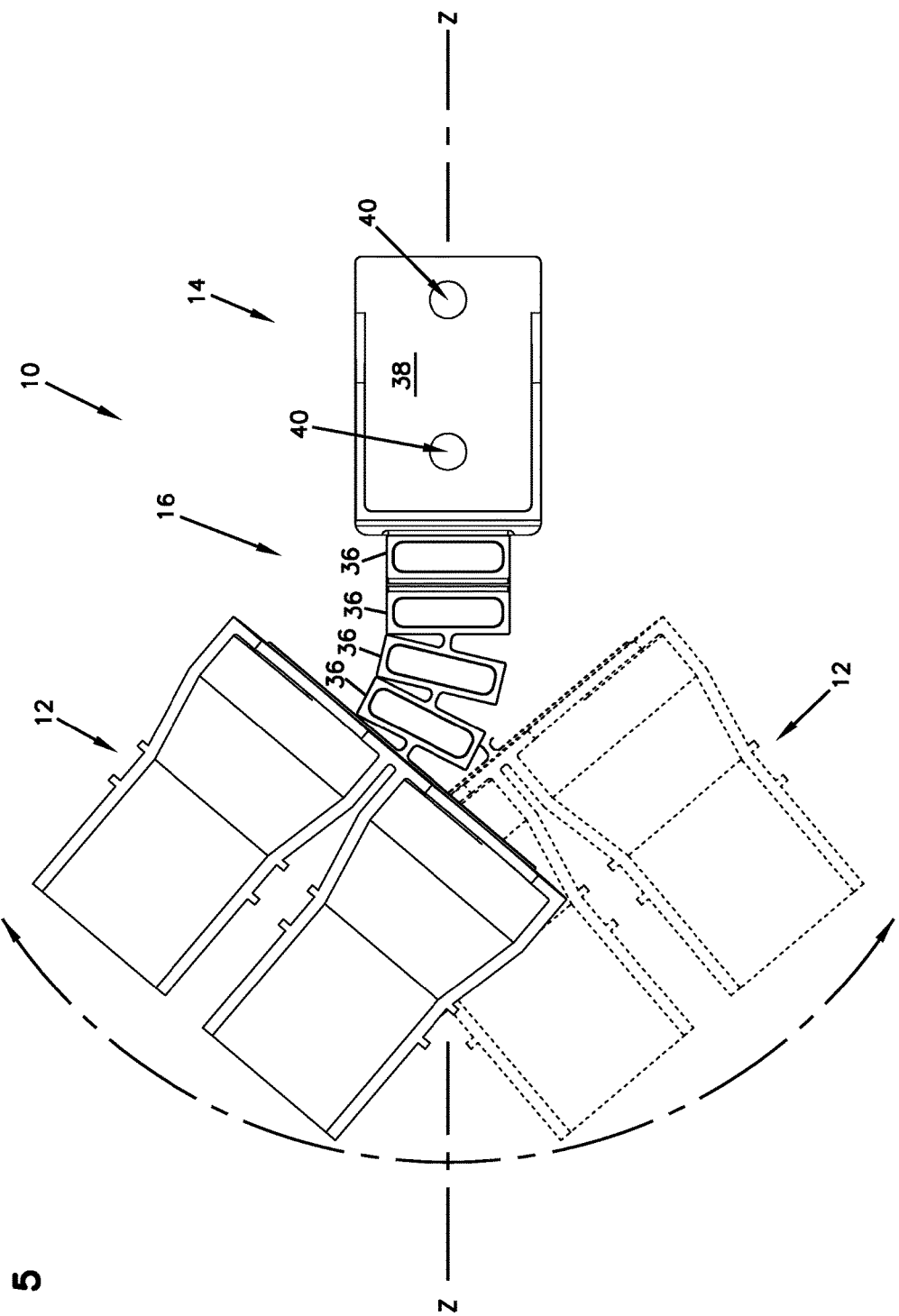
FIG. 5 illustrates a top view of the cable bracket adaptor shown in FIG. 1, showing a second range of flexed motion.

As particularly depicted in FIG. 5, the first hinges 52 can provide for a flexible range of motion by the cable support section 12 in either direction along the X plane. The cable support section 12 can flex with respect to the telecommunications equipment mount section 14. As depicted, the range of X-plane rotation can extend until adjacent rectangular shaped blocks 36 contact each other at contact points.

The second hinges 50 can flex independently from the first hinges 52. The first hinges 52 can also flex independently from the second hinges 50. The first hinges 52 and the second hinges 50 can alternatively rotate simultaneously to generate a multi-planar flexion of the flexible neck 16.

Figure 6:
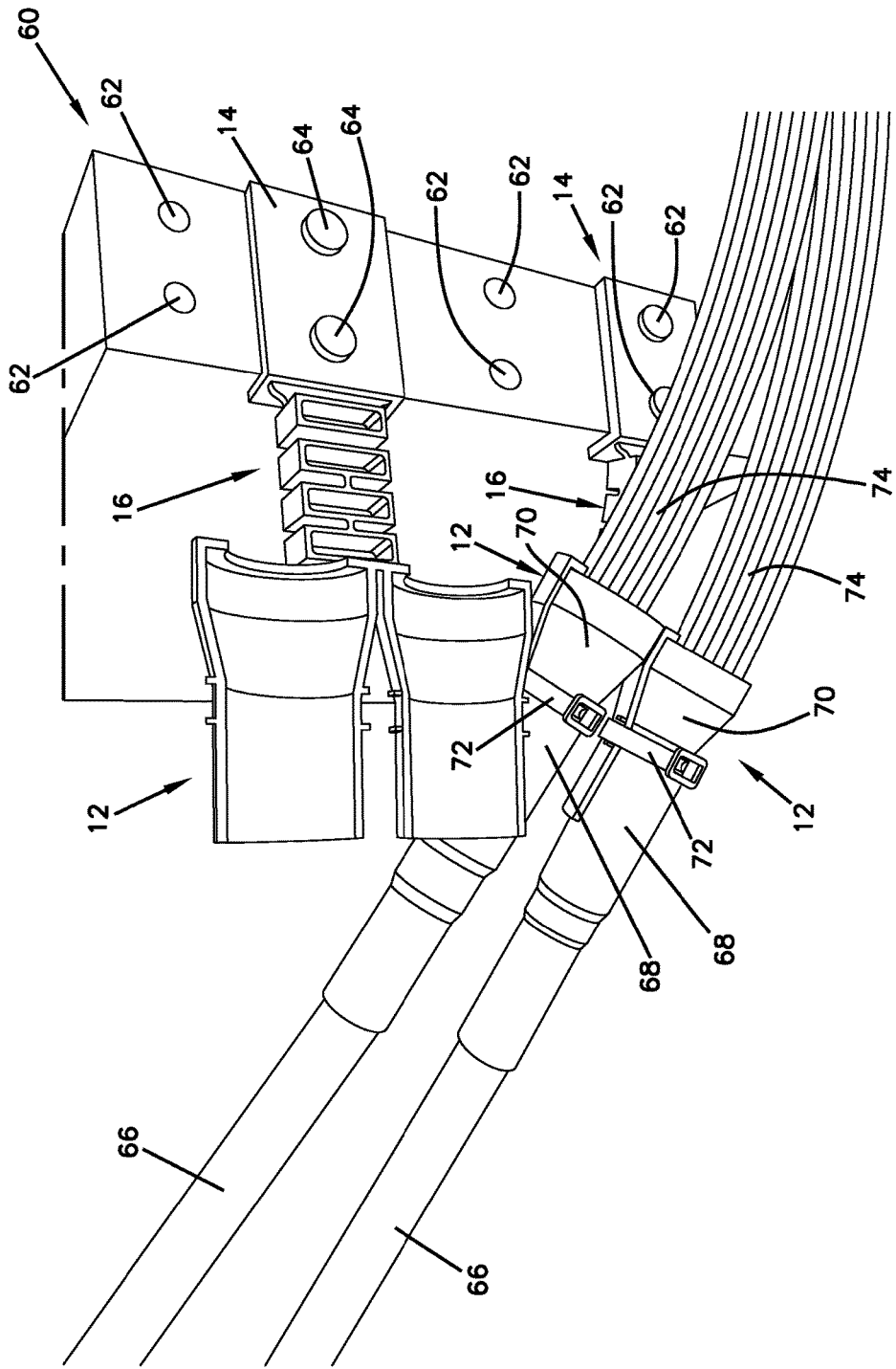
FIG. 6 illustrates the cable bracket adaptor shown in FIG. 1, shown mounted to telecommunications equipment and securing a pair of cables.
Figure 7:
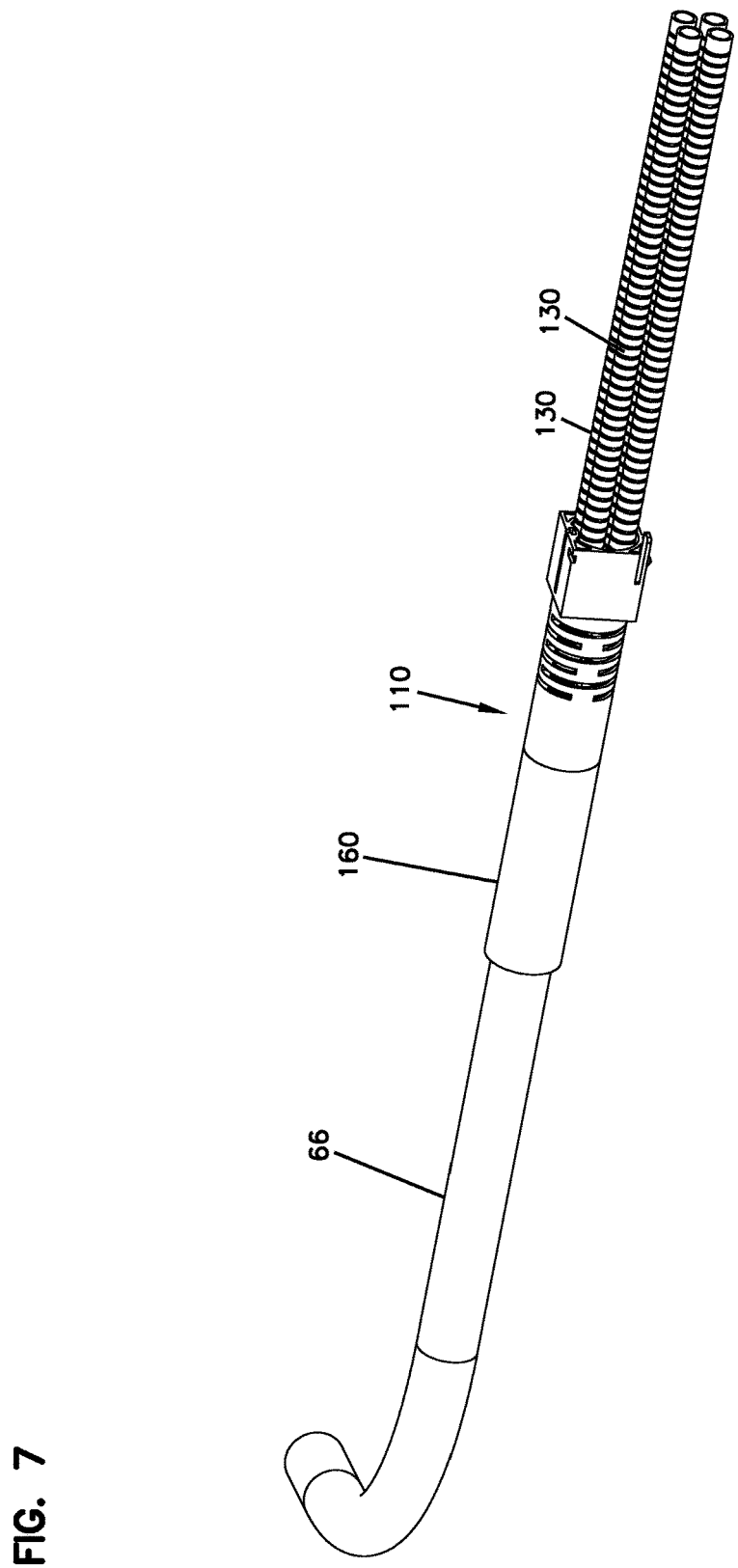
FIG. 7 illustrates a perspective view of a flexible cable breakout on a cable in accordance with another embodiment.

FIG. 6 depicts the adaptor 10 secured to telecommunications equipment 60 and supporting a set of cables 66. As depicted, multiple adaptors 10 can be secured to the same telecommunications equipment 60. The telecommunications equipment mount section 14 can be mounted by engaging the mounting side of the mounting plate 38 (FIGS. 1A-1B) with a first surface of the telecommunications equipment 60. The apertures 40 in the mounting plate 38 (FIGS. 1A-1B) can be aligned with a set of receiver apertures 62 in the telecommunications equipment 60. Fasteners 64, for example bolts, can be fixedly inserted through the mounting plate apertures 40 (FIGS. 1A-1B) and into the telecommunications equipment apertures 62. If the telecommunications equipment 60 is a fiber optic chassis, as depicted in FIG. 6, a side of the protruding lip 54 (FIG. 1A) opposite the flexible neck 16 can engage a second surface of the chassis to provide additional support.

As depicted in FIG. 6, the cable receiver end 18 (FIGS. 1A-1B) of each cable support section 12 can receive an end portion 68 of the trunk cables 66. The fan out receiver end 22 (FIGS. 1A-1B) of each cable support section 12 can receive a fan out portion 70 of the fiber optic cables. Fasteners 72, for example zip ties, can fit within the fastener guides 32 (FIGS. 1A-1B) and secure around the cable receiver ends 18 and the cable end portions 68 to secure the cables 66 within the cable support sections 12. Alternative fasteners can include, without limitation, friction fits, snaps, co-threaded surfaces, and groove-and-tongue.

Figure 1B:
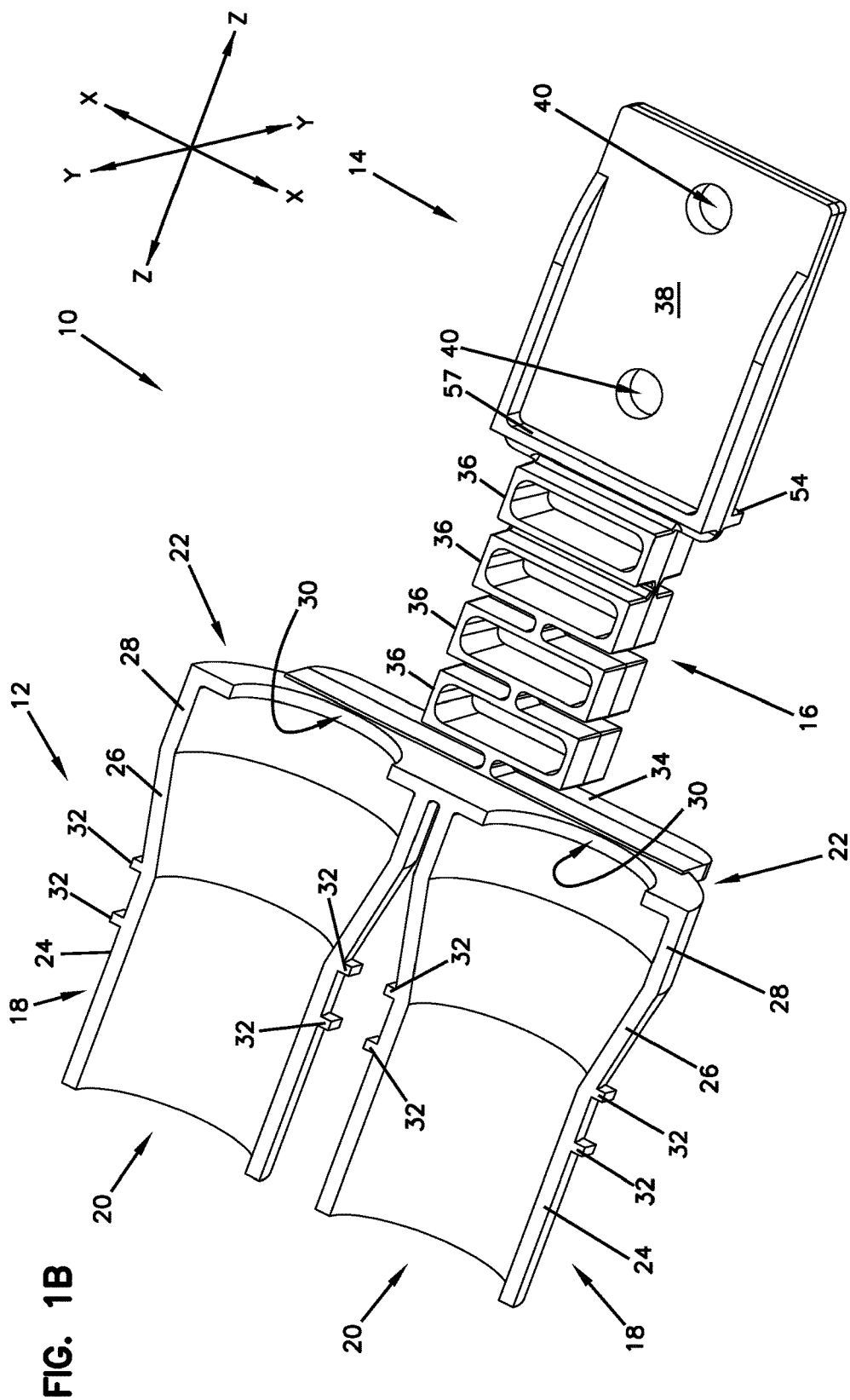
FIG. 1B illustrates a top perspective view of the cable bracket adaptor shown in FIG. 1.
Figure 2:
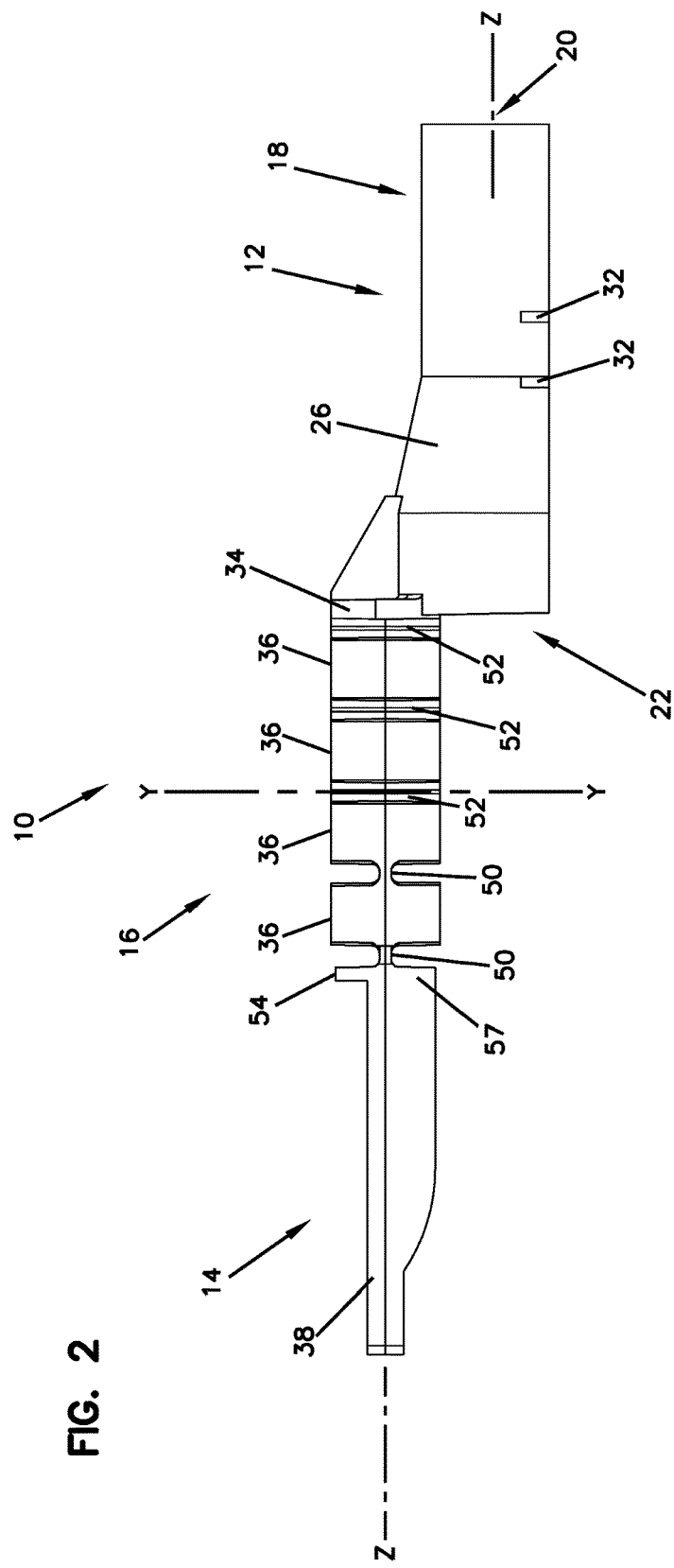
FIG. 2 illustrates a side view of the cable bracket adaptor shown in FIG. 1, shown in a relaxed state.

As depicted, a plurality of optical fibers or tubes 74 can extend out of the cable fan out portions 70 through the fan out receiver end mouths 30 (FIGS. 1A-1B). As shown, when cables 66 are secured to the adaptor 10, and the adaptor is be mounted to telecommunications equipment 60, the flexible neck 16 can flex simultaneously along both the X and Y planes. While flexible neck 16 can flex in 2 planes, flexure in only one plane may occur in some mounting situations.

Figure 8:
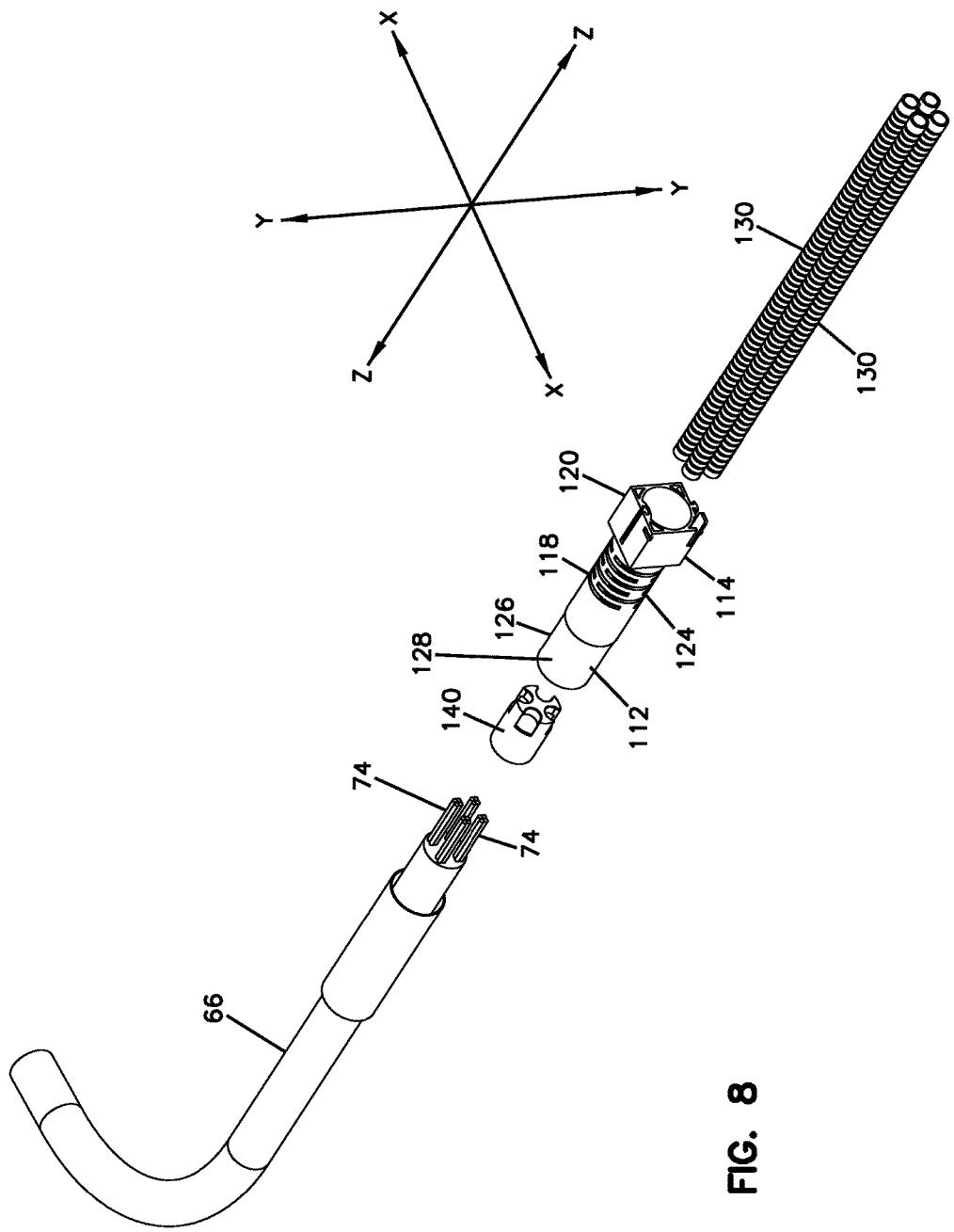
FIG. 8 illustrates the cable and cable breakout of FIG. 7 in exploded view.
Figure 9:
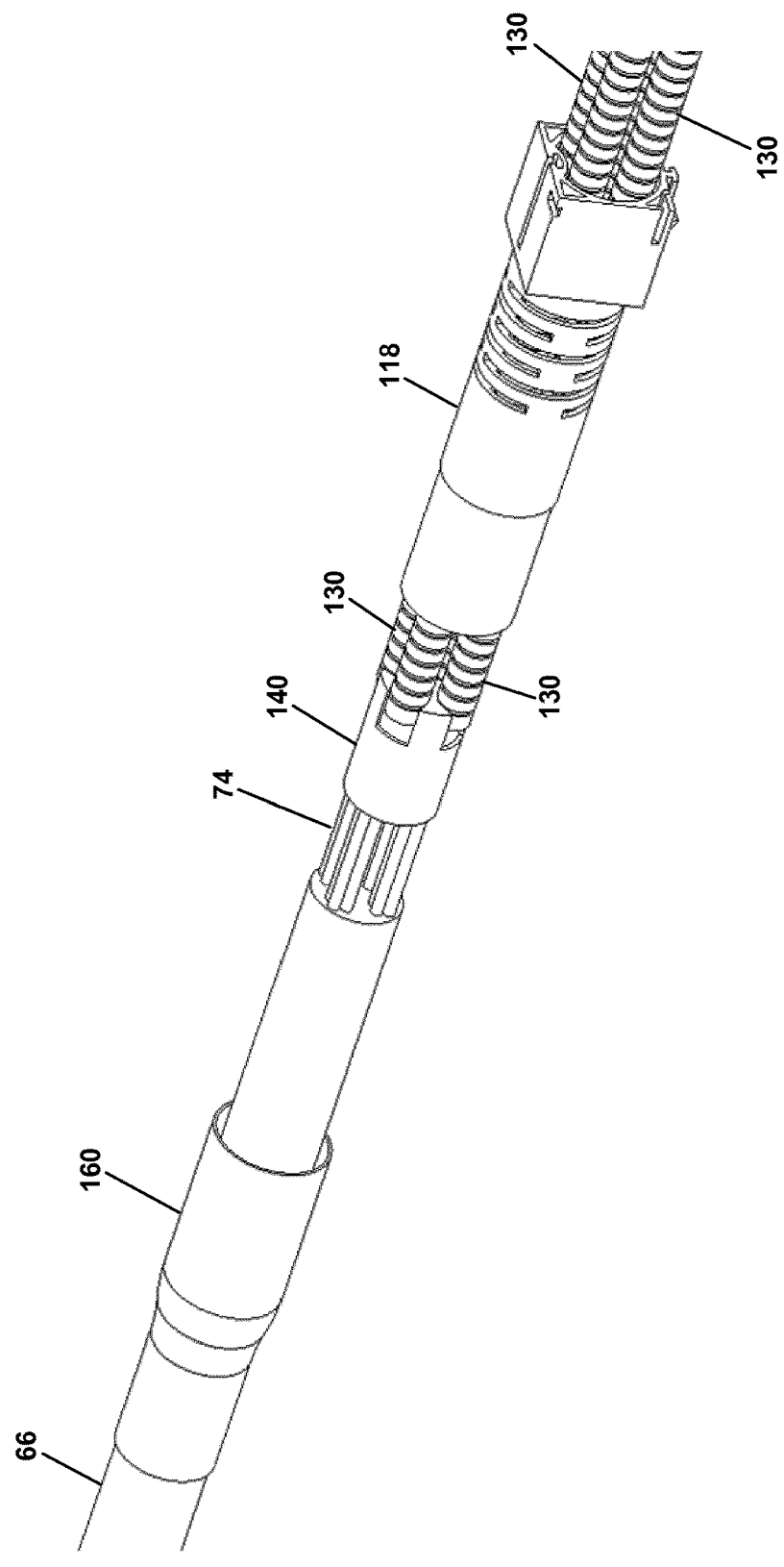
FIG. 9 illustrates the cable and cable breakout of FIGS. 7 and 8 partially assembled.
Figure 10:
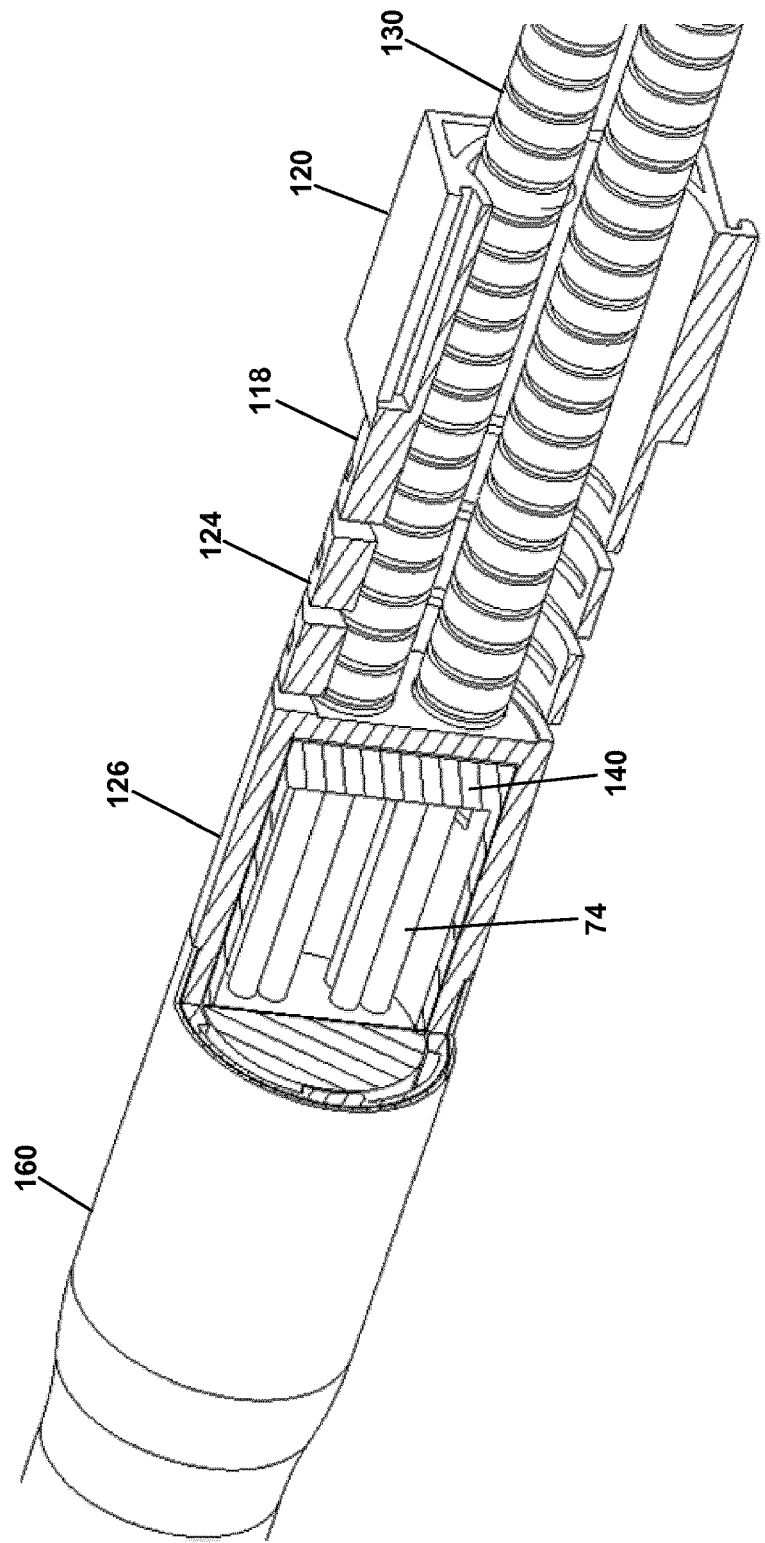
FIG. 10 illustrates a cross-sectional perspective view of portions of the cable and cable breakout of FIGS. 7-9.
Figure 13:
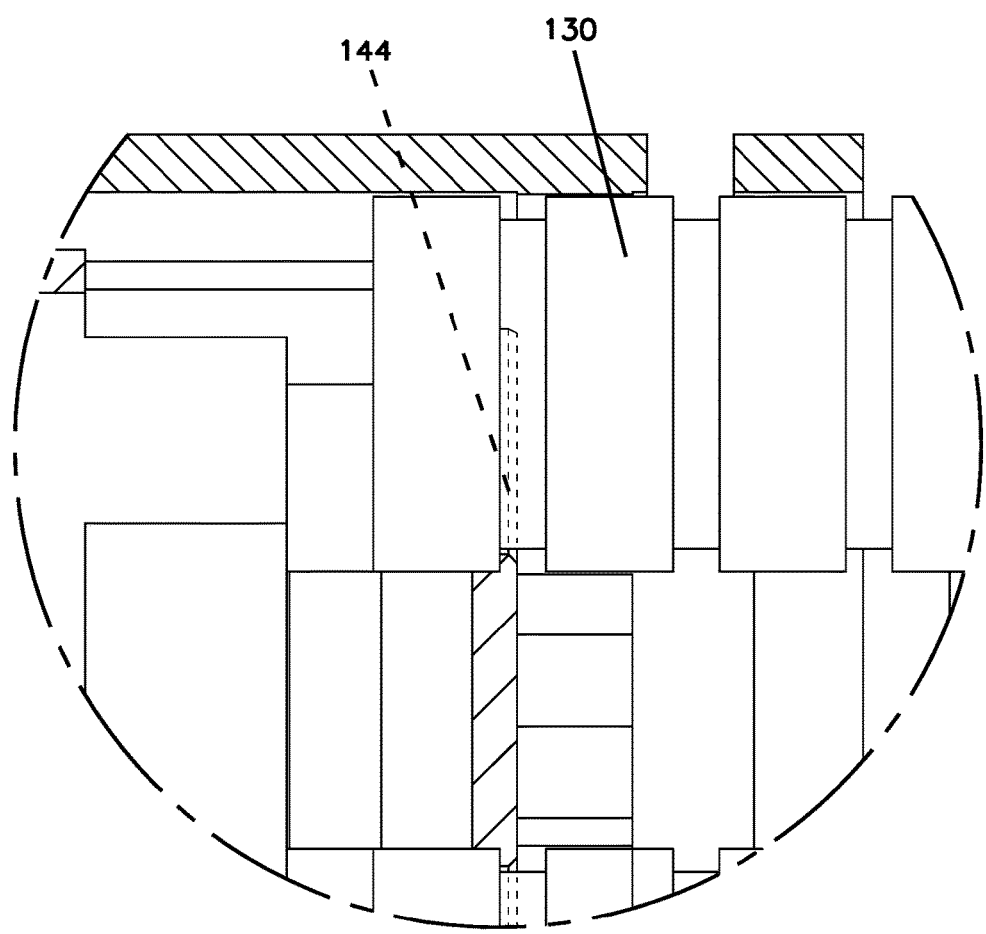
FIG. 13 illustrates an enlarged view of the tubes being held by a tube holder within the cable breakout housing.
Figure 14:
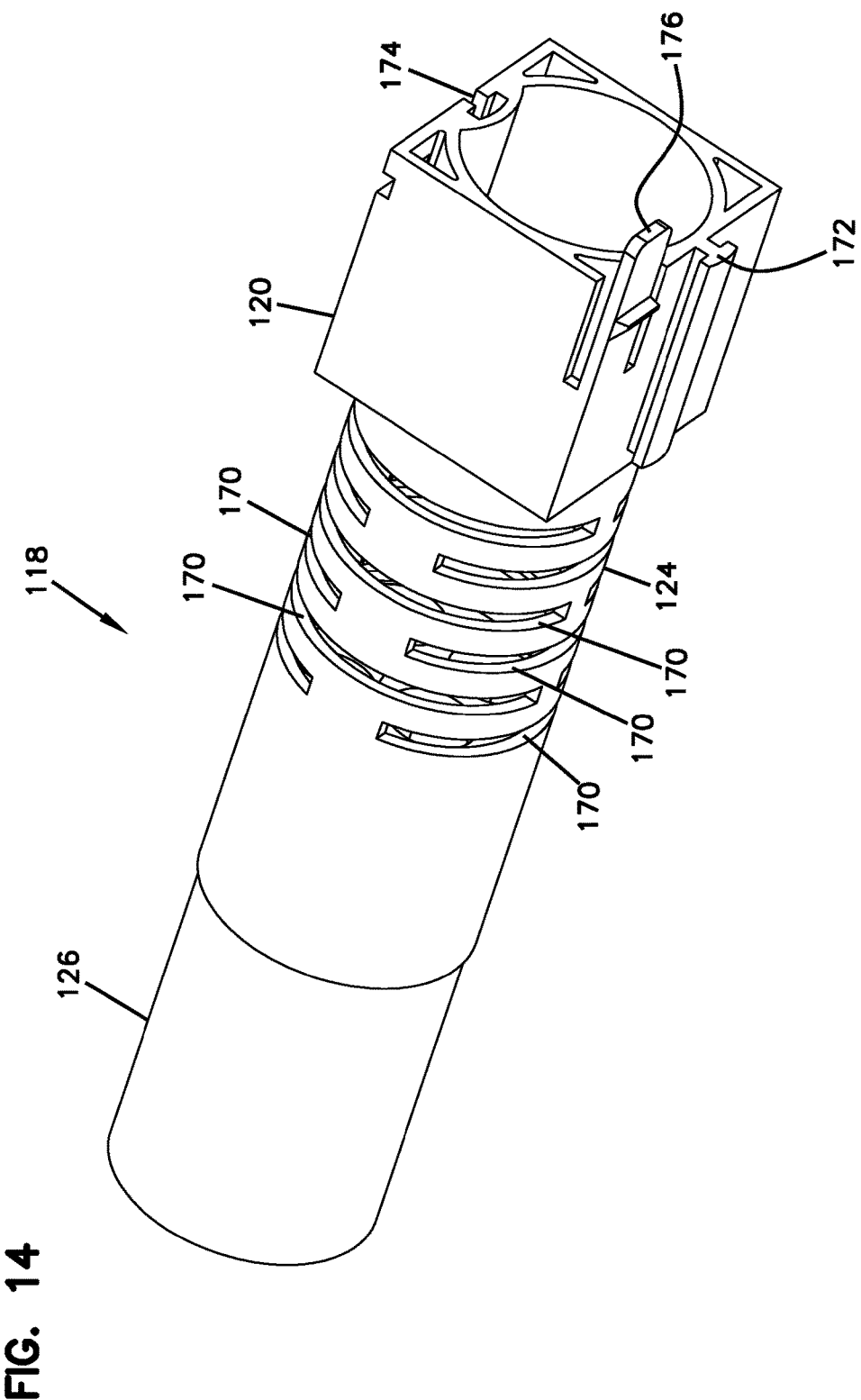
FIG. 14 illustrates a perspective view of the cable breakout housing.
Figure 17:
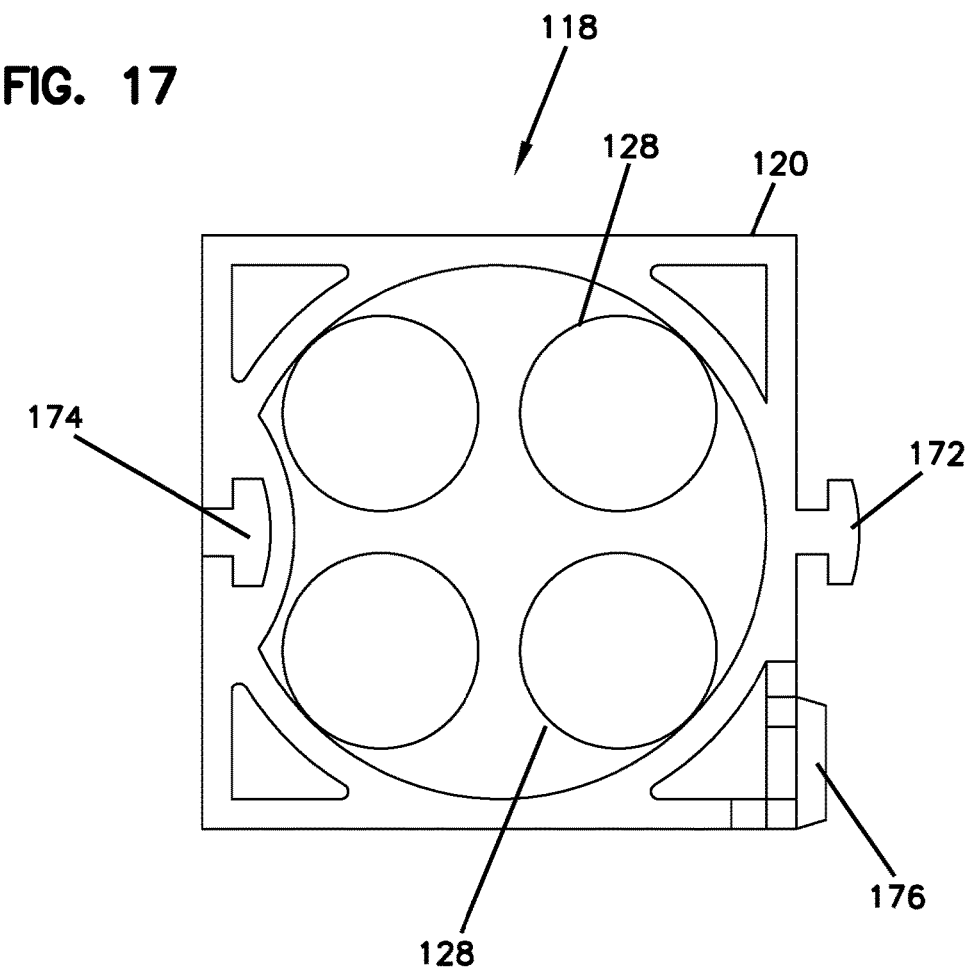
FIG. 17 illustrates an end view of the cable breakout housing.
Figure 18:
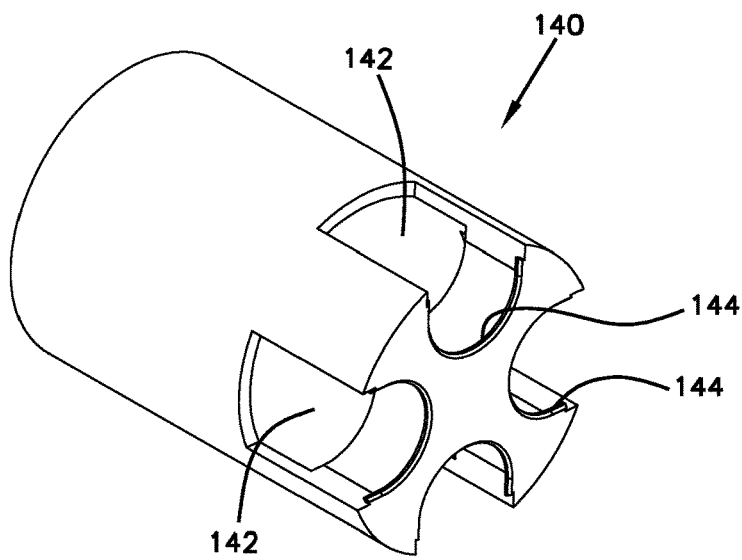
FIG. 18 illustrates a perspective view of the tube holder.
Figure 19:
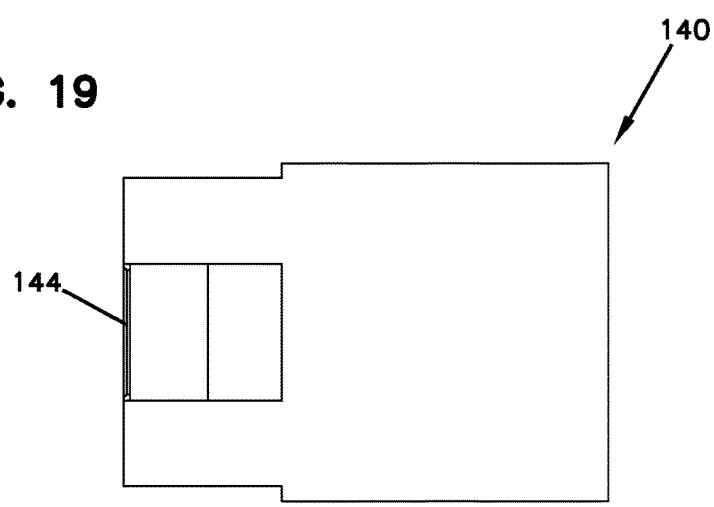
FIG. 19 illustrates a side view of the tube holder.
Figure 20:
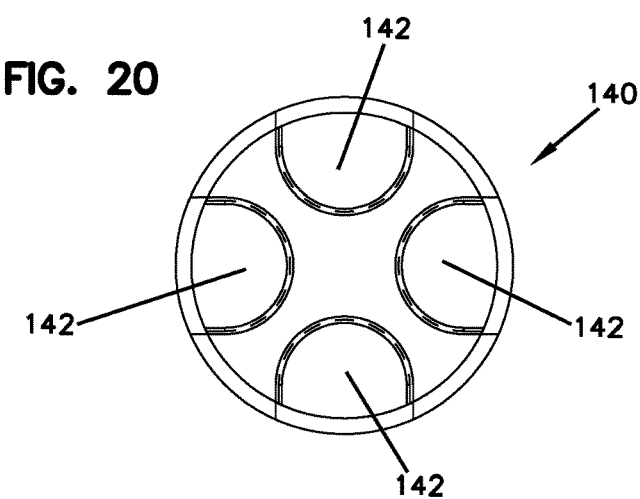
FIG. 20 illustrates an end view of the tube holder.
Figure 21:
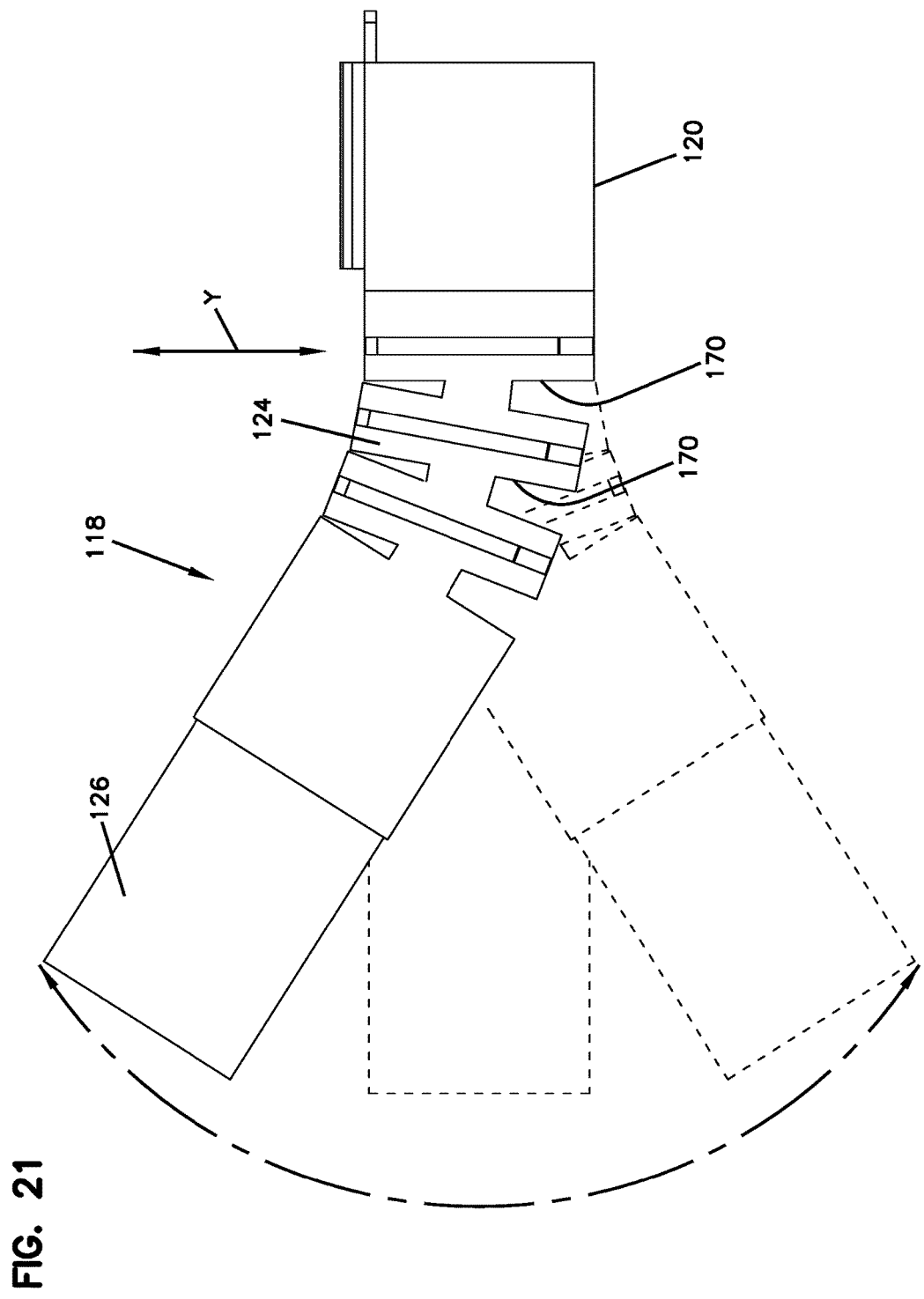
FIG. 21 illustrates the cable breakout housing moveable in the Y direction.
Figure 22:
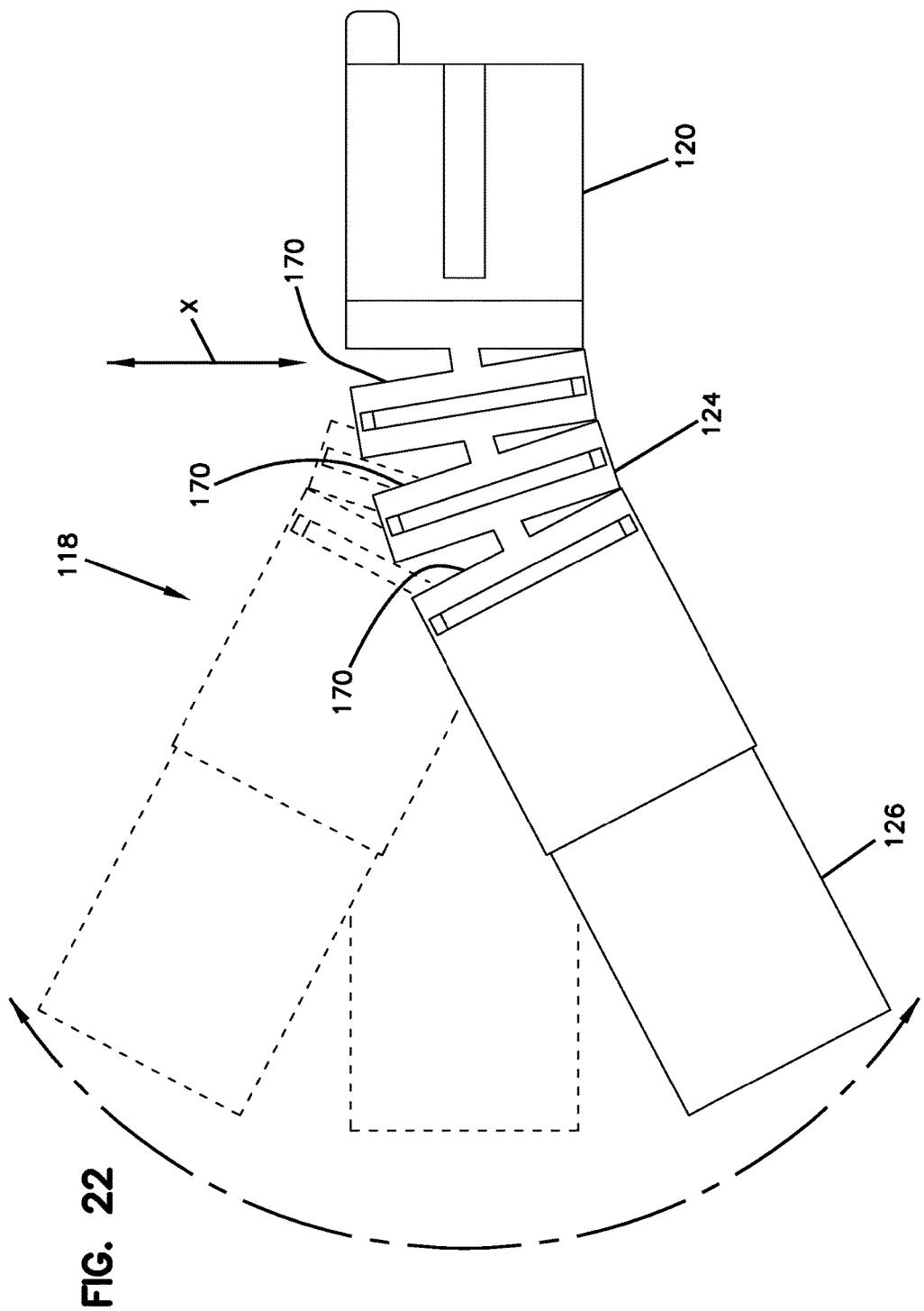
FIG. 22 illustrates the cable breakout housing moveable in the X direction.
Figure 23:
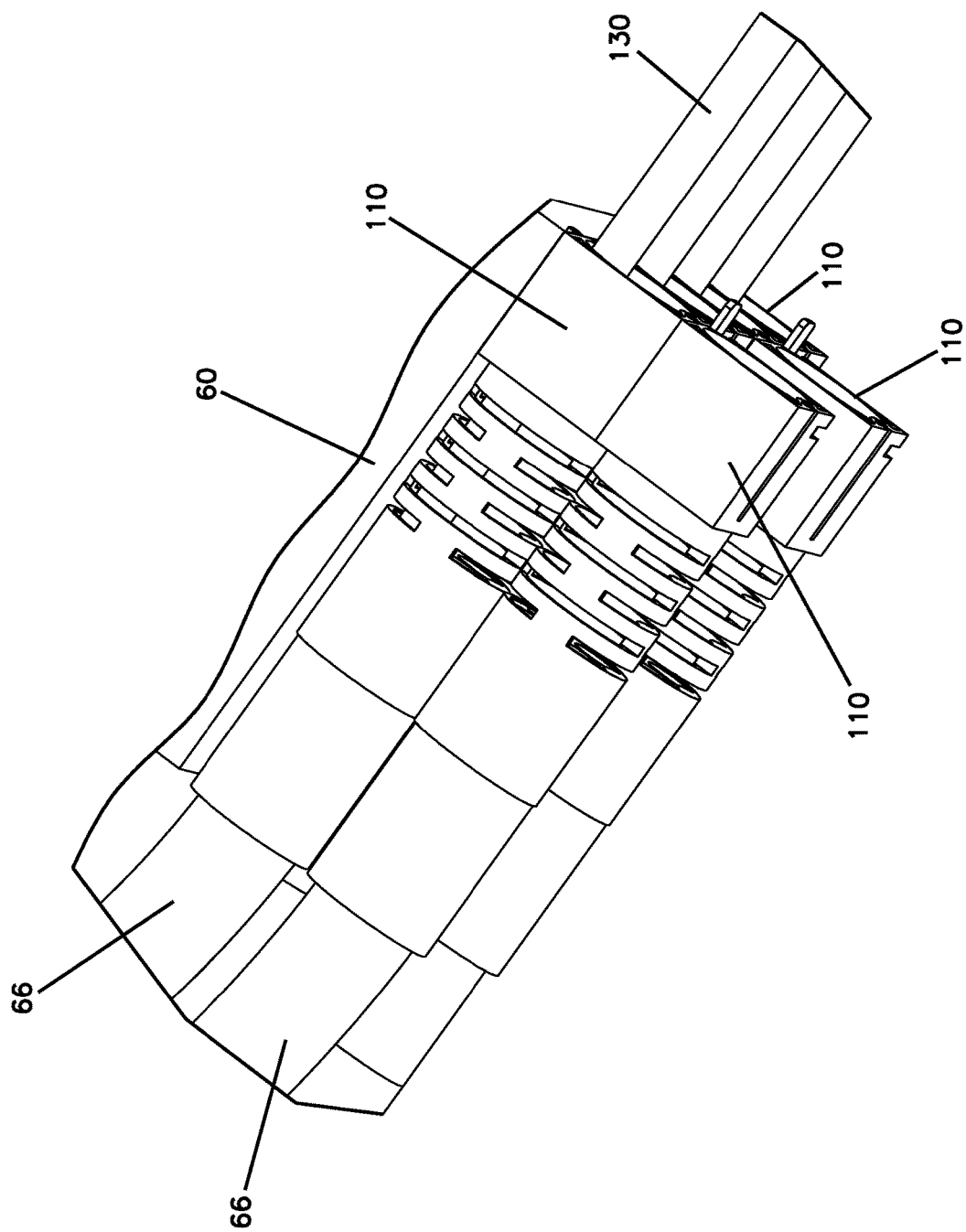
FIG. 23 illustrates multiple cable breakout housings mounted to telecommunications equipment, and wherein the breakout housings are also mountable to each other in a stacked relationship.
Figure 24:
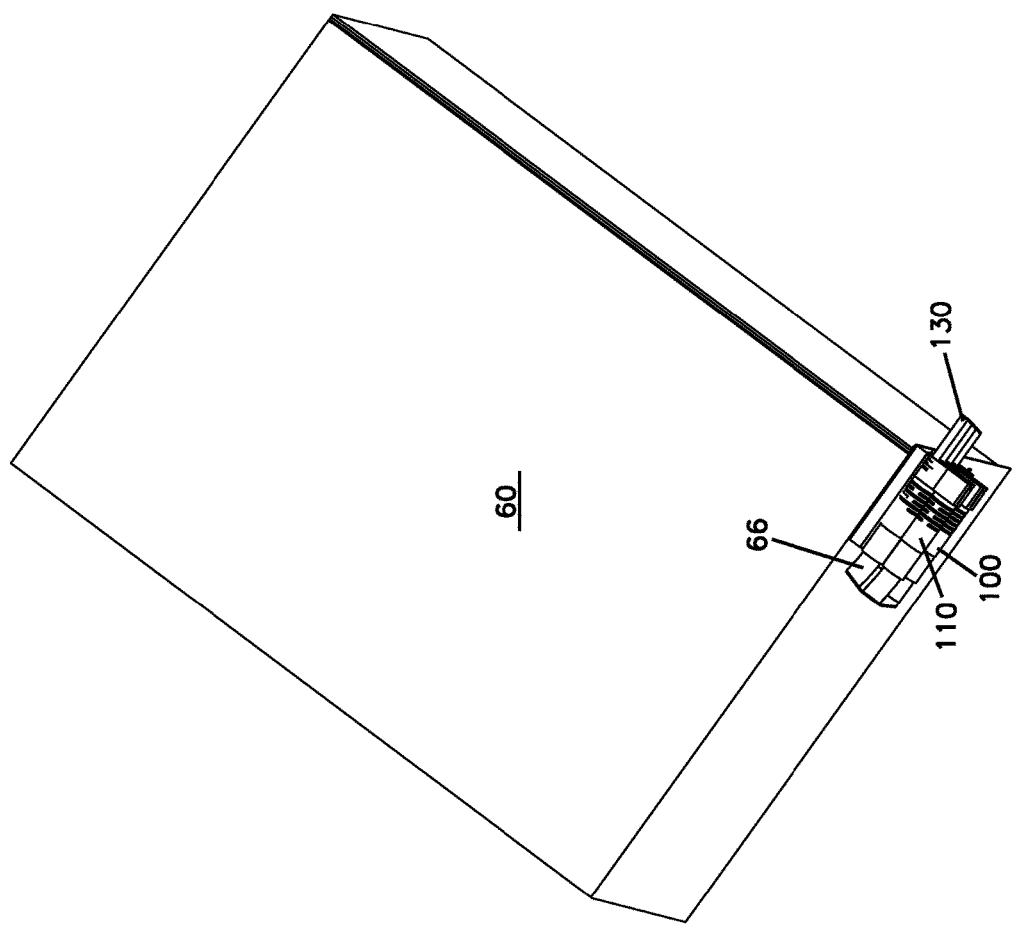
FIG. 24 illustrates the arrangement of FIG. 23 with a representative piece of telecommunications equipment.

Referring now to FIGS. 7-24, an alternative embodiment of a flexible breakout device 110 is depicted. Device 110 forms both a fiber breakout and a flexible mount to mount the cable or cables 66 to telecommunications equipment 60. A cable support section 112 mounts to a cable 66. A telecommunications equipment mount section 114 allows for the mounting of flexible breakout device 110 to telecommunications equipment 60. Device 110 includes a breakout housing 118 with a generally rectangular end 120 and a flexible section 124 extending to a cable engagement section 126. Breakout housing 118 generally surrounds cable 66 at one end, and the outwardly extending fibers 74 or tubes 74 containing the fibers. In FIG. 8, fibers/tubes 74 are shown cut off but in use, fibers/tubes 74 extend through flexible tubes 130.

Housing 118 can receive a plurality of flexible tubes 130 for fibers or tubes 74. A tube holder 140 is received within housing 118 at cable engagement section 126. Tube holder 140 includes a plurality of openings 142 for each receiving a flexible tube 130. A lip 144 provides a retention feature for engaging each tube 130, such as the exterior, including a corrugated tube. Other tube holding devices 140 are possible.

Each tube 130 receives one or more individual fibers, ribbons of fiber, or fiber tubes 74 contained within cable 66. A heat shrink 160 is provided between cable 66 and breakout housing 118 around reduced diameter portion 128. Housing 118 can have a monolithic construction. For example, housing 118 can be made from injection molded plastic.

Flexible section 124 includes a plurality of alternating slits 170 which allow for bending of the flexible section 124. In the illustrated embodiment, the flexible section 124 is bendable in both the X and Y directions which allows for three dimensional positioning of cable 66 relative to end 120 of housing 118 so as to promote convenient mounting of each cable 66 to equipment 60 and/or positioning of the cable 66 in and around the rack, or cabinet. Slits 170 pass completely through the tubular shape of housing 118.

End 120 of housing 118 includes a tongue 172 and an opposite groove 174 for receiving another tongue 172 to facilitate mounting to equipment 60, or to an adjacent end 120. A flexible tab 176 allows for release of end 120 from equipment 60, or from an adjacent end 120. As shown, ends 120 are stackable relative to each other. The tongue and groove mounting system is used to longitudinally slide ends 120 relative to each other or to a mounting plate.

From the foregoing detailed description, it will be evident that modifications and variations can be made in the devices of the disclosure without departing from the spirit or scope of the invention.

What is claimed is:
1. A fiber-optic cable adaptor for mounting to telecommunications equipment, the adaptor comprising:
    a fiber-optic cable support;
    a mounting base for mounting to telecommunications equipment; and
    a neck extending between a free end and a fixed end, the neck comprising a plurality of flex points to flex along at least two different planes, wherein the fiber-optic cable support is secured to the neck free end and the neck fixed end is flexibly fixed to the mounting base; wherein the fiber-optic cable support receives a cable breakout.

2. The adaptor of claim 1, wherein the flex points comprise hinges aligned along the at least two different planes.

3. The adaptor of claim 1, wherein the neck comprises a plurality of vertebrae positioned in alternation with the plurality of flex points.

4. The adaptor of claim 3, wherein the vertebrae comprise rectangle-shaped blocks.

5. The adaptor of claim 4, wherein adjacent rectangle-shaped blocks engage each other when adjacent flex points are flexed.

6. The adaptor of claim 4, wherein at least one flex point connects at least one rectangle-shaped block to the mounting base.

7. The adaptor of claim 6, wherein the at least one rectangle-shaped block engages the mounting base when the at least one connecting flex point is fixed.

8. The adaptor of claim 4, wherein at least one flex point connects at least one rectangle-shaped block to the fiber-optic cable support.

9. The adaptor of claim 8, wherein the at least one rectangle-shaped block engages the fiber-optic cable support when the at least one connecting flex point is fixed.

10. The adaptor of claim 1, wherein the plurality of flex points comprise at least one flex point aligned to flex along a first plane, and at least one flex point aligned to flex along a second plane that is different from the first plane.

11. A flexible breakout device for securing to telecommunications equipment, the device comprising:
a cable support for supporting fiber optic cables;
a mounting base for mounting to telecommunications equipment; and
a neck extending between a free end secured to the cable support and a fixed end flexibly fixed to the mounting base, the neck comprising a flexible portion to flex in three dimensions;
wherein the cable support supports a cable breakout.

12. The device of claim 11, wherein the cable support, the mounting base, and the neck form a cable breakout housing, and further including a tube mount for mounting tubes for receiving fibers and/or tubes from the cable.

13. The device of claim 12, wherein the mounting base includes a tongue and groove arrangement.

14. The device of claim 13, wherein the mounting base includes a lip.

15. The device of claim 11, wherein the neck includes vertebrae connected by flex points.

16. The device of claim 11, wherein the neck is tubular and includes slits.

17. A method for flexibly securing fiber optic cables with respect to telecommunications equipment, the method comprising:
rigidly mounting a fixed end of a flexible breakout device to the telecommunications equipment;
supporting the fiber optic cables within at least one cable support flexibly secured with respect to the fixed end, the cable support being flexible in three dimensions with respect to the fixed end; and
securing the fiber optic cables within the at least one cable support;
wherein the at least one cable support receives a cable breakout.

18. The method of claim 17, wherein the at least one cable support mounts to the end of a jacketed cable.

* * * * *